United States Patent [19]

Evans et al.

[11] 4,201,370
[45] May 6, 1980

[54] METHOD AND APPARATUS FOR HEAT TREATING MATERIALS TO REMOVE CONTAMINANTS

[75] Inventors: Marvin Evans; David H. Miller, both of Milwaukee, Wis.

[73] Assignee: College Research Corporation, Butler, Wis.

[21] Appl. No.: 923,019

[22] Filed: Jul. 10, 1978

[51] Int. Cl.² ............... F27D 7/00; F27B 7/34; F23B 5/04
[52] U.S. Cl. .................. 266/44; 110/184; 110/204; 266/156; 266/173; 432/72
[58] Field of Search ............ 266/44, 156, 158, 159, 266/145, 173, 205, 213, 901; 432/72; 110/184, 204–207

[56] References Cited

U.S. PATENT DOCUMENTS

| | | | |
|---|---|---|---|
| 3,550,925 | 12/1970 | Evans et al. | 266/205 |
| 3,564,699 | 2/1970 | Moore | 266/213 |
| 3,627,289 | 12/1971 | Erman | 432/72 |
| 3,794,459 | 2/1974 | Meenan | 432/72 |
| 3,933,343 | 1/1976 | Rawlings | 266/901 |
| 4,010,935 | 3/1977 | Stephens | 266/901 |
| 4,040,608 | 8/1977 | Vicard | 266/44 |
| 4,113,977 | 9/1978 | Hochstrasser et al. | 266/901 |

FOREIGN PATENT DOCUMENTS 37-16151 of 1962 Japan ................. 266/173

Primary Examiner—L. Dewayne Rutledge
Assistant Examiner—Peter K. Skiff
Attorney, Agent, or Firm—Andrus, Sceales, Starke & Sawall

[57] ABSTRACT

A method and apparatus for heat treating metals to remove contaminants. Contaminated scrap metal is fed into one end of a rotating inclined retort. Heat is applied to the retort as the scrap metal is conveyed therein to remove the contaminant, and the processed metal is discharged from the opposite end of the retort. Combustible waste gases generated through the processing are fed to an afterburner where the combustible gases are burned and are discharged from the afterburner into a stack. A portion of the hot combusted gases are returned from the stack to the discharge end of the retort to thereby minimize oxidation of the scrap metal being treated as well as conserving fuel.

6 Claims, 3 Drawing Figures

U.S. Patent
May 6, 1980
4,201,370
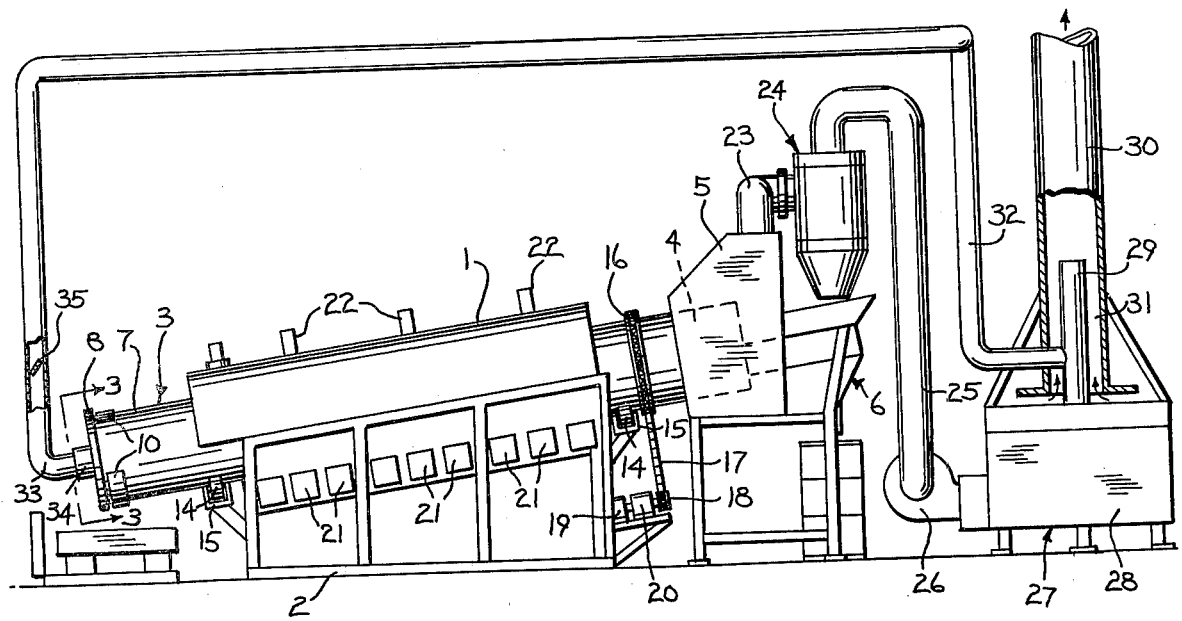
Fig. 1
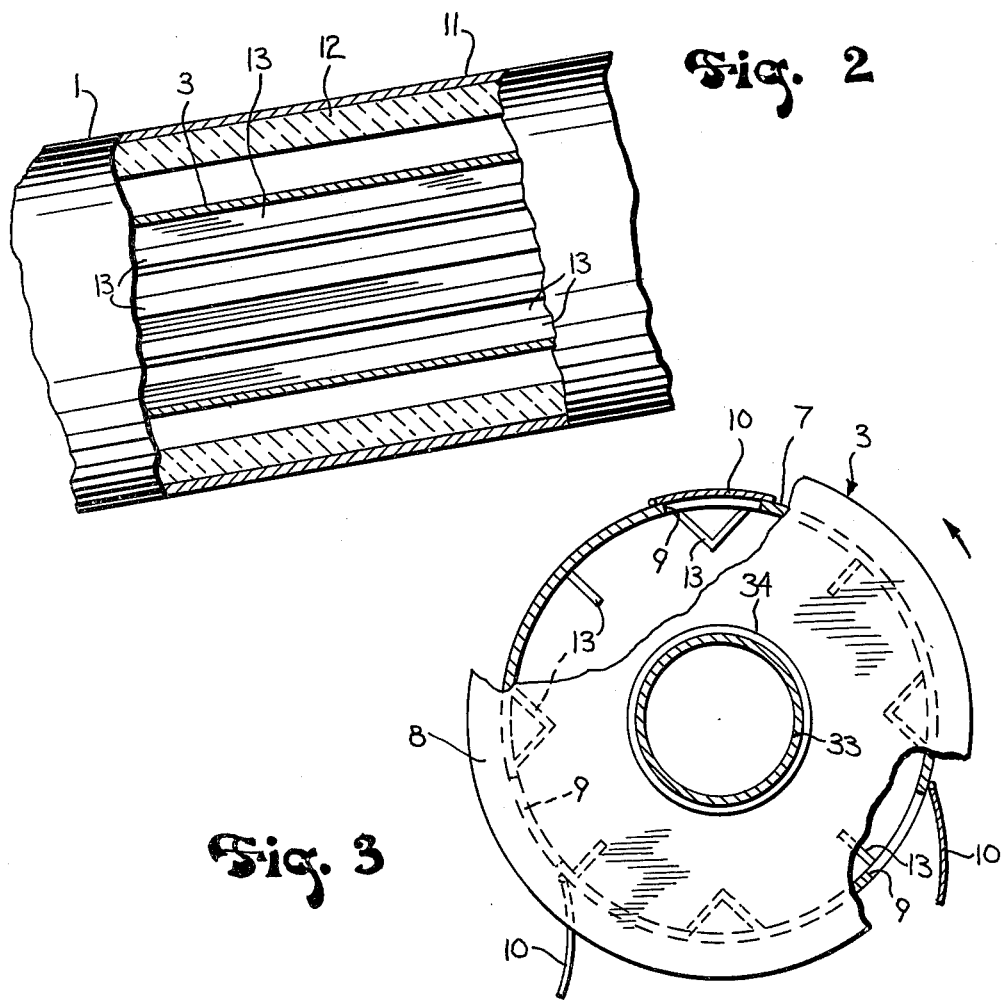
Fig. 2
Fig. 3

METHOD AND APPARATUS FOR HEAT TREATING MATERIALS TO REMOVE CONTAMINANTS

BACKGROUND OF THE INVENTION

U.S. Pat. No. 3,550,925 illustrates an apparatus that can be used to separate metals of different melting points and includes an inclined retort which is mounted for rotation within a gas furnace. The material to be processed is charged in the upper end of the retort, and as the material is conveyed downwardly within the retort it is heated and the lower melting point metal will be melted and separated from the higher melting point metal.

With a structure as disclosed in the aforementioned patent, combustible waste gases are generated through the processing and discharged from the upper end of the retort. For pollution control, the gases are normally passed through a cyclone separator to remove the particulate material and then passed through an afterburner where the combustible gases are fully combusted.

The apparatus as disclosed in U.S. Pat. No. 3,550,925 can also be used to remove oil, or other combustible contaminants, from metal scrap, such as borings, turnings, chips, and the like. The oil will vaporize as the scrap is heated and a portion of the vaporized oil will be burned in the retort, while the remaining portion of the oil vapor, as well as the gases of combustion, will be conducted to an afterburner for final combustion. With this type of process, accurate temperature and atmospheric control must be maintained in order to volatilize and partially combust the oil, while not oxidizing, melting, or fusing the metal scrap.

SUMMARY OF THE INVENTION

The invention is directed to a method and apparatus for treating raw contaminated materials, such as scrap metal containing a second metal as a contaminant, or metal scrap containing a combustible material such as oil, plastic, or the like, as a contaminant. In accordance with the invention, the raw contaminated material is fed into one end of a rotating inclined retort. Heat is supplied to the retort as the scrap material is conveyed to remove the contaminant, and the processed material is discharged from the opposite end of the retort.

Combustible waste gases, generated through the processing of the scrap, are fed from the upper end of the retort through a cyclone separator to remove the particulate material and then conducted to an afterburner. In the afterburner, the combustible waste gases are finally combusted and the gases of combustion are discharged through a stack to the atmosphere.

In accordance with the invention, a portion of the gases being discharged through the stack from the afterburner are returned to the discharge end of the retort and pass counter-currently through the retort.

The velocity of the gas being introduced into the discharge end of the retort can be controlled by use of a damper or valve, to prevent metal fines from being blown through the retort and into the afterburner.

Introducing the combusted gases into the retort provides a positive movement of the gases through the retort so that the gases will not be exhausted from the retort into the surrounding environment. As the recycled gases are at an elevated temperature, generally in the range of 1200° F. to 1800° F., fuel is conserved in the treating process.

The recycled gases consist primarily of water vapor and carbon dioxide and have a very low oxygen content, thereby preventing oxidation of the scrap material being treated.

As a further advantage, the recycled gases have an extremely low dew point and when introduced into the retort will increase the rate of volatilization of the oil or other organic contaminants.

As the afterburner is operating at a superatmospheric pressure, while the discharge end of the retort is at atmospheric or negative pressure, there is a natural draft to conduct the gases from the afterburner to the retort so that no auxilliary blower or fluid moving device is required.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation showing the apparatus of the invention;

FIG. 2 is an enlarged side elevation showing the furnace and retort with parts broken away in section; and FIG. 3 is a section taken along line 3—3 of FIG. 1.

DESCRIPTION OF THE PREFERRED EMBODIMENT

The drawings illustrate an apparatus as used to remove combustible contaminants from metal scrap and which comprises an outer shell or furnace 1 which is supported on a frame 2. A generally cylindrical inclined retort 3 is mounted for rotation within the furnace 1 and the scrap material to be treated is introduced into the upper end 4 of the retort which projects outwardly beyond the furnace and is enclosed by a hood 5. As shown in FIG. 1, a feeder unit 6 feeds the scrap metal into the upper end of the retort. As the scrap material is conveyed downwardly through the retort, it is heated and the combustible contaminants are removed.

The treated metal is discharged from the lower end portion 7 of the retort which projects outwardly beyond the furnace 1. As shown in FIG. 1, the lower end 7 is enclosed by a plate 8 and the treated metal scrap is discharged through a series of openings 9 which are located in the cylindrical wall of the retort adjacent plate 8. Each of the openings 9 is enclosed by a hinged door 10, and as the retort rotates each door will successively fall by gravity to the open position, thereby permitting the treated metal scrap to be discharged from the retort. As rotation of the retort continues, each door will automatically be returned by gravity to the closed position to restrict the introduction of oxygen into the retort.

The furnace 1 includes an outer steel housing 11 having a refractory lining 12 which is spaced woutwardly of the retort 3.

A series of longitudinal bars 13 are secured to the inner surface of the retort and acts to tumble and agitate the metal scrap as it is conveyed in the retort.

The retort 3 is journalled for rotation about its axis on two pair of rollers 14 which are journalled in channels 15 that are mounted on frame 2.

To rotate the retort, a sprocket 16 is secured to the outer surface of the retort and is connected by chain 17 to drive sprocket 18. Sprocket 18 is driven by a motor 19 acting through a conventional speed reducing transmission 20.

The scrap metal being conveyed through the retort is heated by a series of conventional gas burners 21 which are mounted within the wall of the furnace 1. The gases of combustion resulting from the operation of burners 21 can be vented through vents 22.

The scrap metal coated with oil is fed by the feeder mechanism 6 into the upper end of the retort 3. As the retort rotates, the scrap material is conveyed downwardly through the furnace 1. Heating of the scrap will vaporize the oil and a portion of the oil vapor will be combusted in the upper end portion of the inclined retort. The waste gases of combustion, as well as the unburned vaporized oil, are discharged from the upper end of the retort and pass through hood 5 and conduit 23 to the cyclone separator and scrubber 24 where the particulate materials are removed from the gases. The gases are then conducted from the cyclone separator 24 through conduit 25 by blower 26 to afterburner 27.

The afterburner 27 is of conventional construction and includes a lower conbustion chamber 28 where the combustible waste gases are burned, and the resulting gases are discharged from the combustion chamber through a stack 29. Surrounding the stack 29 is an outer stack 30 which is spaced from the stack 29 to provided an annular clearance 31. The bottom of the annular clearance communicates directly with the atmosphere so that air will be drawn upwardly through the annular clearance and will be combined with the gases exiting from the upper end of stack 29 to thereby provide a final combustion zone for the gases.

In accordance with the invention, a conduit 32 connects the stack 29 of the afterburner 27 with the discharge end 7 of retort 3, so that a portion of the combusted gases will be returned to the retort. As shown in FIG. 1, the end 33 of the conduit 32 is mounted within an annular sleeve 34 that extends outwardly from plate 8. This connection permits the retort 3 to rotate relative to conduit end 33.

To control the flow of gas through the conduit 32 a damper or valve mechanism 35 is provided in the conduit. The operator can adjust the flow of gas through the conduit 32 to obtain the desired combustion conditions in the retort 3.

The gases being recycled to the retort have a temperature generally in the range of 1200° F. to 1800° F., and the heated gases act to supply a portion of the energy for heating the metal scrap, thereby reducing the fuel required for the process.

As the recycled gases have an extremely low dewpoint, the rate of volatilization of the oil or other contaminant will be increased. With a higher dew point it would be necessary to heat the combustible material to a higher temperature in order for it to volitalize, and this would require additional energy.

By returning a portion of the gases to the retort, a positive directional flow of gas through the retort is achieved which minimizes the leakage of gases from the retort into the surrounding environment.

The gases being returned to the retort have a low oxygen content and thus will aid in preventing oxidation of the metal scrap. Through operation of the damper or valve mechanism 35, it is possible to achieve the desired combustion characteristics in the retort to provide optimum conditions for the volatilization and combustion of the oil, as well as preventing oxidation, fusing and melting of the metal scrap.

While the above description has illustrated the use of the invention in a process for removing contaminants from metal scrap, the invention can also be utilized when separating metals of different melting points as well as in the general incineration of waste materials. Furthermore, in some applications the scrap or other material to be treated can be fed into the low end of the retort and discharged from the high end.

Various modes of carrying out the invention are contemplated as being within the scope of the following claims particularly pointing out and distinctly claiming the subject matter which is regarded as the invention.

We claim:

1. An apparatus for treating materials to remove combustible substances thereform, comprising a furnace, a rotable inclined retort disposed within the furnace for conveying material to be treated, feeding means for introducing the material into the upper end of the retort, discharge means for removing the treated material from the lower end of the retort, heating means associated with the furnace for heating the retort and the combustible substances therein to produce combustible gases, gas combustion means separate from the retort and having an inlet to receive said combustible gases and having an outlet stack, first conduit means connecting one end of the retort and said inlet for conducting said combustible gases to said combustion means, the combustible portion of said gases being burned in said combustion means, and the combusted gases being discharged through the stack, second conduit means connecting said stack with the other end of said retort for conducting said combusted gases to said retort, closure means for enclosing said other end of the retort and having an opening to receive said second conduit means, and means for mounting the retort for rotation relative to said second conduit means.

2. The apparatus of claim 1, and including an outer stack spaced concentrically outward from said first stack to provide an annular clearance therebetween, said second concuit means extending radially through said outer stack.

3. The apparatus of claim 1, and including a discharge opening in the wall of the retort adjacent said plate.

4. The apparatus of claim 1, and including valve means in said second conduit means for controlling the flow of gas therethrough.

5. An apparatus for treating materials to remove combustible substances therefrom, comprising a furnace, a rotatable inclined retort disposed within the furnace and adapted to convey a material to be treated, feeding means for introducing the material into the upper end of the retort, discharge means for removing the treated material from the lower end of the retort, heating means associated with the furnace for heating the retort and the combustible substance therein to produce waste gases, gas combustion means separate from the retort and having an inlet to receive said waste gases and having an outlet stack, first conduit means connecting the upper end of the retort and said inlet for conducting said waste gases to said combustion means, the combustible portion of said waste gases being burned in said conbustion means and the combusted gases being discharged through said stack, second conduit means connecting the stack with the lower end of the retort for conducting only a portion of said combusted gases to said retort, valve means disposed in said second conduit means for controlling the flow of said combusted gases to the retort, a closure to enclose the lower end of the retort and having an opening to receive said second conduit means, and means for mounting the retort for rotation relative to said second conduit means.

6. A method of treating scrap metal to remove contaminants therefrom, comprising the steps of feeding the scrap metal into the upper end of an inclined retort, rotating the retort to convey the scrap metal downwardly through the retort, heating the scrap metal being conveyed in the retort to vaporize the contaminants and generate combustible gases, discharging the treated scrap metal from the lower end of the retort, conducting the combustible gases from the upper end of the retort to a combustion chamber, combusting the combustible gases in said chamber and discharging the gases of combustion through a stack, returning a portion of said gases of combustion from the stack to the lower end of the retort, and passing the gases of combustion through the retort in contact with the scrap metal and in a countercurrent direction with respect to the direction of flow of the scrap metal.

* * * * *

UNITED STATES PATENT AND TRADEMARK OFFICE
CERTIFICATE OF CORRECTION

PATENT NO. : 4,201,370
DATED : May 6, 1980
INVENTOR(S) : MARVIN EVANS and DAVID H. MILLER It is certified that error appears in the above-identified patent and that said Letters Patent are hereby corrected as shown below:

Column 2, Line 62, Cancel "woutwardly" and substitute therefor ---outwardly---, Column 3, Line 28, Cancel "provided" and substitute therefor ---provide---, Column 4, CLAIM 5, Line 65, Cancel "conbustion" and substitute therefor ---combustion---

Signed and Sealed this

Twenty-third Day of September 1980

[SEAL]

Attest:

SIDNEY A. DIAMOND

Attesting Officer　　　Commissioner of Patents and Trademark